R. J. RIENDEAU.
TUBE DEFLATION.
APPLICATION FILED MAY 16, 1921.
1,434,452. Patented Nov. 7, 1922.
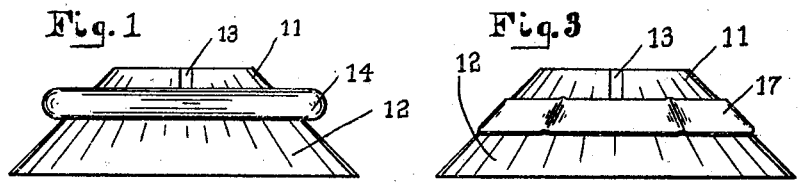
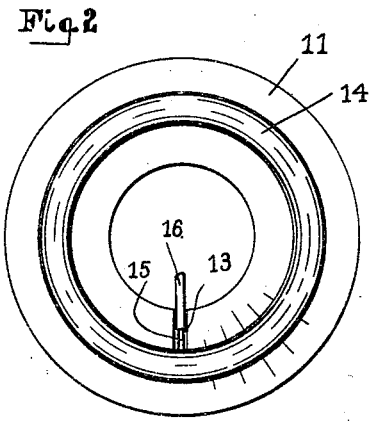
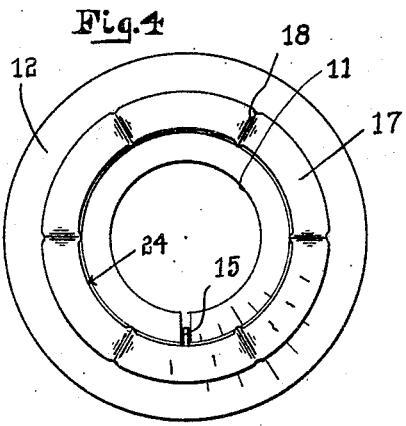
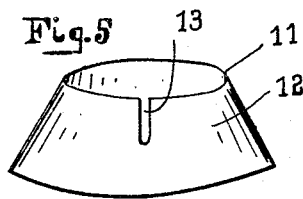
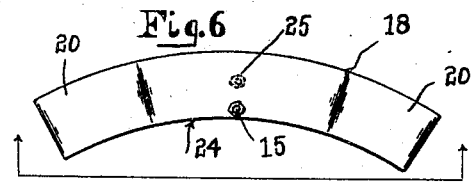
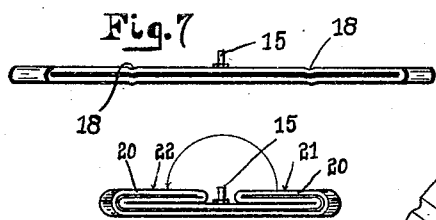
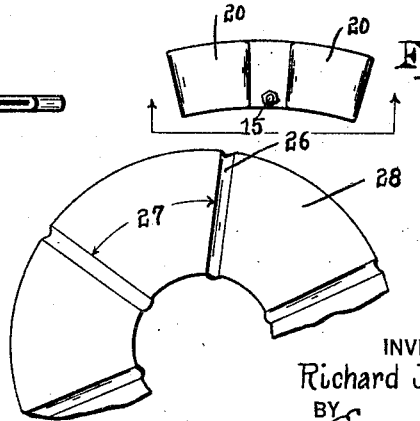
INVENTOR
Richard J. Riendeau
BY
Edward C. Taylor
ATTORNEY Patented Nov. 7, 1922.

1,434,452

UNITED STATES PATENT OFFICE.

RICHARD J. RIENDEAU, OF ALDENVILLE, MASSACHUSETTS, ASSIGNOR TO THE FISK RUBBER COMPANY, OF CHICOPEE FALLS, MASSACHUSETTS, A CORPORATION OF MASSACHUSETTS.

TUBE DEFLATION.

Application filed May 16, 1921. Serial No. 470,132.

*To all whom it may concern:*

Be it known that I, RICHARD J. RIENDEAU, a citizen of the United States of America, residing at Aldenville, in the county of Hampden and State of Massachusetts, have invented certain new and useful Improvements in Tube Deflation, of which the following is a specification.

My invention relates to a device and method for deflating rubber inner-tubes such as are used as air containers in pneumatic tire casings and more especially refers to the deflation of rubber tubes which have been vulcanized upon curved mandrels.

It is the object of my invention to deflate rubber inner-tubes vulcanized upon curved mandrels with the same speed and neatness as it is possible to deflate and fold up rubber inner-tubes vulcanized upon straight mandrels.

It is customary and most simple to deflate rubber tubes which have been vulcanized on straight mandrels by hanging them up by their valves and sucking the air out of them. As the tube collapses it straightens out free of wrinkles since the inside and outside circumferential lengths of the tube are equal in length as vulcanized, and the deflated tube will form a flat straight band. By the ordinary deflation methods it is difficult to control the wrinkles in rubber tubes which have been vulcanized upon curved mandrels for the inside and outside vulcanized circumferential lengths are unequal as vulcanized and as the tube deflates numerous wrinkles running in different directions form upon the tube surface. Tubes built upon curved mandrels are generally of the heavy truck type and wrinkles formed during deflation are difficult to remove or shift from one place to another. Although many methods have been tried, the deflation of large size curved mandrel tubes has been an uncertain and unsatisfactory proposition.

By means of my invention I obviate the difficulties of deflating and neatly folding rubber tubes built on curved mandrels. I can deflate a curved mandrel tube free of wrinkles or can control them so that waves will form where it is desired later to fold the tube. It will be understood that my invention is applicable also to tubes vulcanized on straight mandrels, but it finds its principal advantages in operating upon curved mandrel tubes.

My invention will now be explained with reference to the accompanying drawings, in which:

Fig. 1 shows a side view of a deflating form with a tube mounted thereon ready to be deflated;

Fig. 2 is a plan view of Fig. 1;

Fig. 3 is a side view of the deflating form showing the tube just after it has been deflated;

Fig. 4 is a plan view of Fig 3;

Fig. 5 is a perspective view of the deflating form;

Fig. 6 is a plan view of a tube after it has been removed from the stand and is laid flat just prior to folding for shipment;

Fig. 7 is a front view of Fig. 6;

Fig. 8 is a plan view of the tube at an intermediate folding step;

Fig. 9 is a front view of Fig. 8; and

Fig. 10 is a plan view of a modified deflating form.

In the practice of my invention, I employ a form 11 having an outer substantially frusto-conical surface 12 which has a valve receiving opening 13 in its surface. I place an inflated tube 14 upon the surface 12 with its valve 15 projecting through the slot 13 as shown by Fig. 2. A suction pipe 16 is attached to valve 15 and the tube is deflated as shown by 17 Figs. 3 and 4.

It has been found by experiment that by varying the slope of the outside face of the deflating stand different deflation results will be obtained. The most satisfactory slope proves to be approximately 45° and at this slope the rubber tube deflates as shown by Figs. 3 and 4 forming approximately equally spaced waves 18 extending in lines radiating from the apex of the cone. These waves are to be distinguished from the irregular wrinkles formed by deflating a tube without the use of my invention, for they can be ironed out or their position shifted by running one's hand lightly over the tube and they furthermore extend regularly transversely of the tube. As the rubber tube deflates upon the form its outer portion tends to sag, causing the valve 15 to take a position near the upper edge 24 of the tube. This relative position of the valve and the edge 24 is desirable for, although the opposite sides of the tube are drawn tightly together when suction is applied to the interior of the tube, there will always be an air channel along the folded edge. If the valve were in a position as indicated at 25 and suction were applied, the opposite side of the tube would be drawn tightly against the valve pad so as to prevent any further suction within the tube. Since in practicing my invention the valve 15 lies in a position adjacent the edge 24 a free air channel is maintained around the tube, thus obviating any difficulty due to the tube collapsing near the valve while there is still air in other parts of the tube.

After the tube has been deflated, it is turned so that the valve 15 and the creases 18 will take the relative positions shown by Figs. 6 and 7. The outside segments 20 are folded on the waves 18 (Fig. 6) taking the positions shown by Figs. 8 and 9, and surface 21 is finally folded over to lie upon surface 22.

The substantially frusto-conical surface described above may be modified to have a plurality of flat, dished out, or raised portions, which will aid in forming a wrinkle or wave where it is desired. Fig. 10 shows one form of modification having dished out portions or grooves 26 at regular intervals 27 around a substantially frusto-conical surface 28.

Having thus described my invention, I claim:

1. A tapered tube deflating form.

2. A substantially conical tube deflating form.

3. A rubber tube deflating form comprising a substantially conical outside surface, and a plurality of wrinkle forming elements on the outside surface.

4. A substantially frusto-conical tube deflating form having its outside surface sloping at approximately 45° and having a valve receiving opening in its outside surface.

5. A method of deflating rubber tubes consisting of supporting an inflated tube upon a tapered surface and exerting suction upon the interior of the tube.

6. A method of deflating rubber tubes which have been vulcanized upon curved mandrels comprising supporting the partially inflated tube at its inner circumference upon a tapered surface, exerting a suction upon the inside of the tube, and permitting the outside of the tube to sag until the tube is completely collapsed.

7. A method of deflating and folding rubber tubes which have been vulcanized upon circular mandrels, comprising mounting an inflated tube upon a tapered surface, exerting a suction upon the interior of the tube in order to collapse it, laying the tube out flat with the valve approximately equidistant from the folded ends and adjacent the inside curved circumferential edge, folding the said ends back toward the valve and then folding the part of the tube on one side of the valve over the part of the tube on the other side of the valve.

RICHARD J. RIENDEAU.